US00RE43827E

(19) United States
(12) Reissued Patent
Chenevert

(10) Patent Number: US RE43,827 E
(45) Date of Reissued Patent: Nov. 27, 2012

(54) ICE SKATE BLADE

(75) Inventor: François Chenevert, Rock Forest (CA)
(73) Assignee: Bauer Hockey, Inc., Greenland, NH (US)

(21) Appl. No.: 29/376,040
(22) Filed: Sep. 30, 2010

Related U.S. Patent Documents

Reissue of:
(64) Patent No.: Des. 488,846
Issued: Apr. 20, 2004
Appl. No.: 29/159,672
Filed: Apr. 26, 2002

U.S. Applications:
(60) Division of application No. 29/319,823, filed on Jun. 16, 2008, which is a continuation of application No. 29/291,961, filed on Sep. 21, 2007, now abandoned, which is a division of application No. 29/213,958, filed on Sep. 23, 2004, now abandoned.

(51) LOC (9) Cl. ..... 21-02
(52) U.S. Cl. ..... D21/761
(58) Field of Classification Search ..... D21/760–764, D21/771; 280/11.18, 11.12, 11.19, 11.22
See application file for complete search history.

(56) References Cited

U.S. PATENT DOCUMENTS 475,650 A 5/1892 Wierda et al.
(Continued)

FOREIGN PATENT DOCUMENTS

CA 1325819 C 1/1994
(Continued)

OTHER PUBLICATIONS

Illustration of an ice skate blade holder and an ice skate blade sold under the trademark "TBLADE".

*Primary Examiner* — Raphael Barkai
(74) *Attorney, Agent, or Firm* — Wolf, Greenfield & Sacks, P.C.

(57) CLAIM

We claim the ornamental design for the ice skate blade, as shown and described.

DESCRIPTION

[FIG. 12 is a left side elevational view of the ice skate blade of FIG. 8;]

[FIG. 13 is a front elevational view of the ice skate blade of FIG. 8; and ]

[FIG. 14 is a rear elevational view of the ice skate blade of FIG. 8.]

*FIG. 15 is a perspective view of an ice skate blade according to a second embodiment of the present design;*

*FIG. 16 is a right side elevational view of the ice skate blade of FIG. 15;*

*FIG. 17 is a top plan view of the ice skate blade of FIG. 15;*

*FIG. 18 is a left side elevational view of the ice skate blade of FIG. 15;*

*FIG. 19 is a rear elevational view of the ice skate blade of FIG. 15; and*

*FIG. 20 is a front elevational view of the ice skate blade of FIG. 15.*

Figures 1, 2, 3, 4, 5, 6, 7:
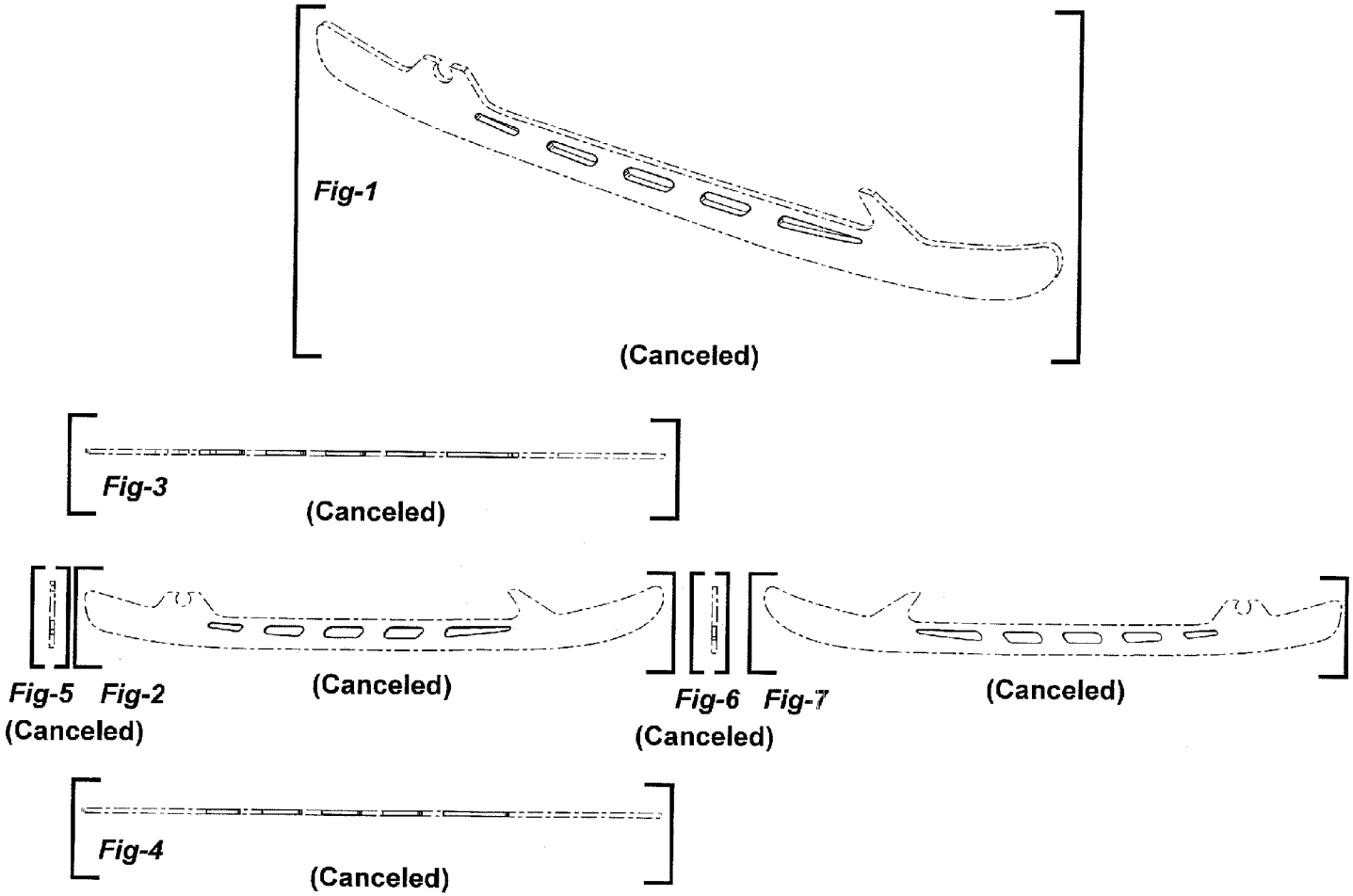
[FIG. 1 is a perspective view of an ice skate blade according to the present design;]
[FIG. 2 is a right side elevational view of the ice skate blade of FIG. 1;]
[FIG. 3 is a top plan view of the ice skate blade of FIG. 1;]
[FIG. 4 is a bottom plan view of the ice skate blade of FIG. 1;]
[FIG. 5 is a rear elevational view of the ice skate blade of FIG. 1;]
[FIG. 6 is a front elevational view of the ice skate blade of FIG. 1;]
[FIG. 7 is a left side elevational view of the ice skate blade of FIG. 1;]
Figure 8:
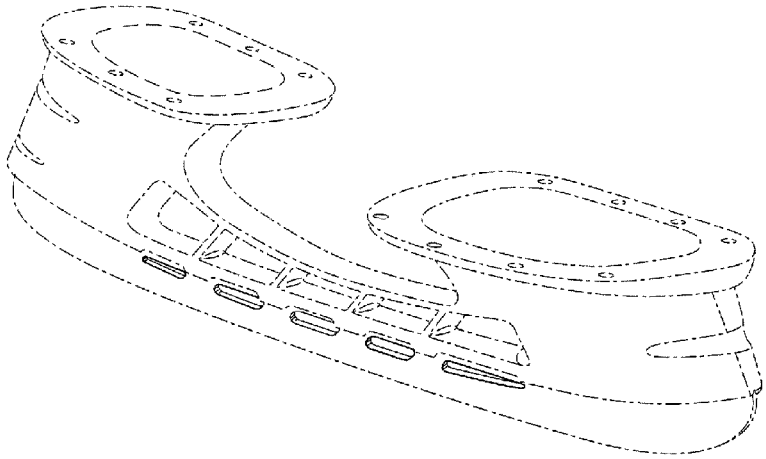
[FIG. 8 is a perspective view of the ice skate blade of FIG. 1 illustrated with an ice skate blade holder in broken lines;]
Figure 10:
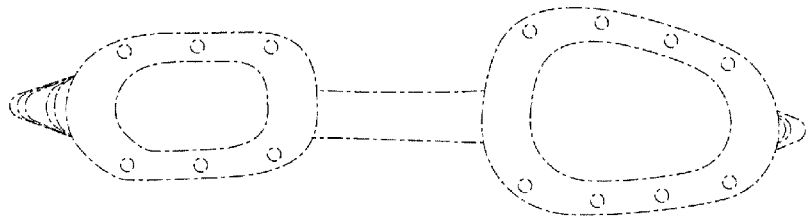
[FIG. 10 is a top plan view of the ice skate blade of FIG. 8;]
Figure 9:
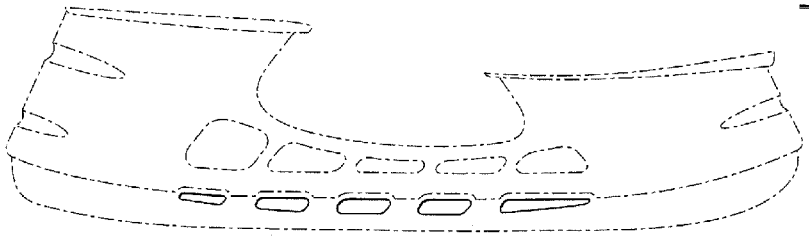
[FIG. 9 is a right side elevational view of the ice skate blade of FIG. 8;]
Figure 11:
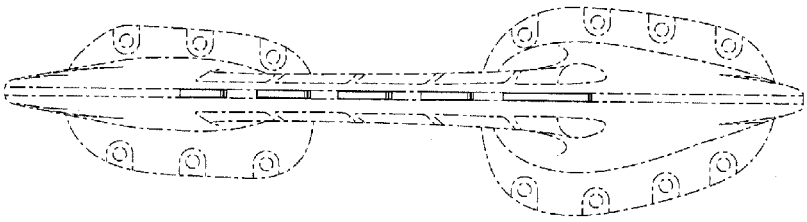
[FIG. 11 is a bottom plan view of the ice skate blade of FIG. 8;]

The broken lines are shown for illustrative purposes only and form no part of the claimed design.

1 Claim, 5 Drawing Sheets

Matter enclosed in heavy brackets [ ] appears in the original patent but forms no part of this reissue; matter printed in italics indicates the additions made by reissue.

*(New)*

U.S. PATENT DOCUMENTS

| | | | | | |
|---|---|---|---|---|---|
| 2,414,967 | A | | 1/1947 | Meyers | |
| 3,212,786 | A | | 10/1965 | Florjancic et al. | |
| 4,074,909 | A | | 2/1978 | Baikie | |
| D250,490 | S | * | 12/1978 | Baikie et al. | |
| D268,125 | S | * | 3/1983 | Baikie | |
| D271,036 | S | * | 10/1983 | Baikie | |
| 4,549,742 | A | | 10/1985 | Husak et al. | |
| D325,416 | S | * | 4/1992 | Olsen et al. | |
| 5,641,169 | A | * | 6/1997 | Bekessy | 280/11.18 |
| D414,017 | S | * | 9/1999 | Lefebvre et al. | D2/904 |
| D430,251 | S | * | 8/2000 | Graf | D21/761 |
| 6,164,667 | A | | 12/2000 | Olivieri | |

FOREIGN PATENT DOCUMENTS

| | | | |
|---|---|---|---|
| CA | 2145520 | A1 | 4/1994 |
| DE | 41 27 294 | C1 | 11/1992 |
| GB | 514214 | | 11/1939 |

* cited by examiner (Canceled)

(Canceled)

(Canceled)
(Canceled)

(Canceled)

(Canceled)

(Canceled)

(Canceled)

(Canceled)

(Canceled)

(Canceled)

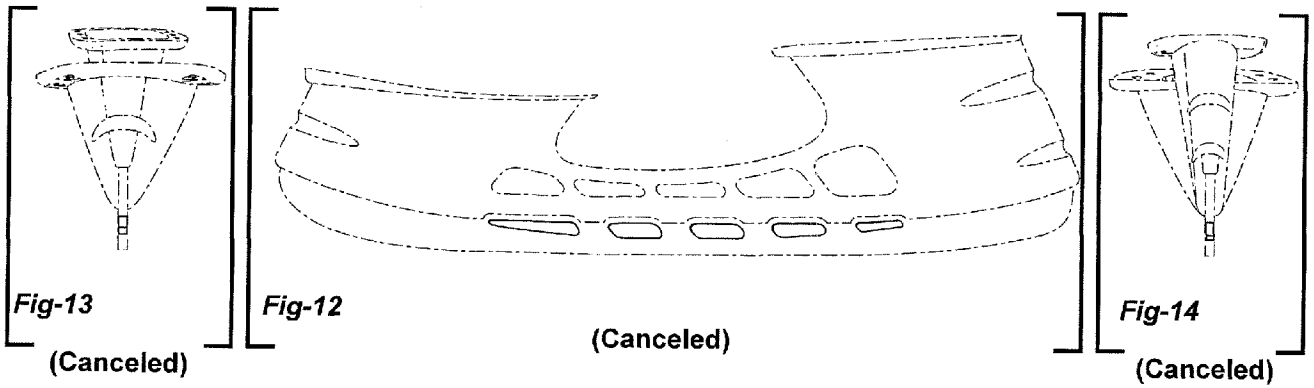
Fig-13 (Canceled)
Fig-12 (Canceled)
Fig-14 (Canceled)

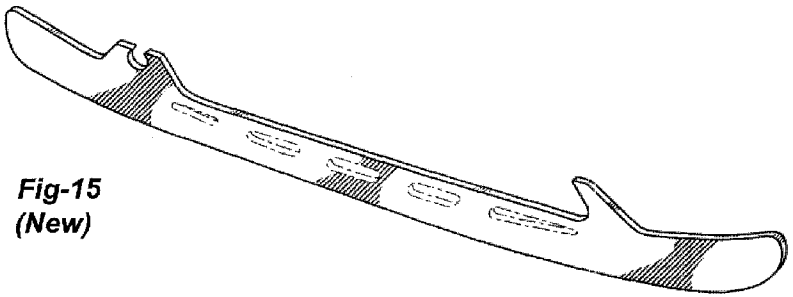
Fig-15 (New)
Fig-17 (New)
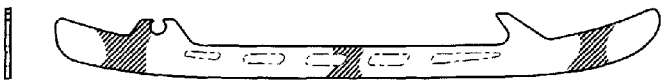
Fig-16 (New)
Fig-19 (New)
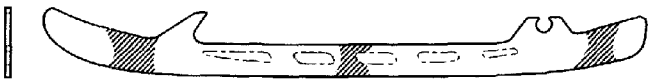
Fig-18 (New)
Fig-20 (New)

UNITED STATES PATENT AND TRADEMARK OFFICE

CERTIFICATE OF CORRECTION

PATENT NO. : RE43,827 E
APPLICATION NO. : 29/376040
DATED : November 27, 2012
INVENTOR(S) : François Chenevert It is certified that error appears in the above-identified patent and that said Letters Patent is hereby corrected as shown below:

In the Description the line beginning with "FIG. 15" should read:

--FIG. 15 is a perspective view of an ice skate blade according to the present design;--

Signed and Sealed this
Twenty-sixth Day of February, 2013

Teresa Stanek Rea
*Acting Director of the United States Patent and Trademark Office*